(12) United States Patent
Booth et al.

(10) Patent No.: US 9,890,862 B2
(45) Date of Patent: Feb. 13, 2018

(54) SUPPORT SYSTEMS FOR MECHANICAL SEALS

(71) Applicants: Christopher Glyn Booth, Barnsley (GB); Andrew Colverson, Doncaster (GB)

(72) Inventors: Christopher Glyn Booth, Barnsley (GB); Andrew Colverson, Doncaster (GB)

(73) Assignee: AES Engineering Ltd., Rotherham (GB)

( * ) Notice: Subject to any disclaimer, the term of this patent is extended or adjusted under 35 U.S.C. 154(b) by 369 days.

(21) Appl. No.: 14/635,749

(22) Filed: Mar. 2, 2015

(65) Prior Publication Data

US 2015/0247576 A1 Sep. 3, 2015

(30) Foreign Application Priority Data

Feb. 28, 2014 (GB) .................. 10403619.8

(51) Int. Cl.
*F16J 15/40* (2006.01)
*F16J 15/34* (2006.01)

(52) U.S. Cl.
CPC ................. *F16J 15/3404* (2013.01)

(58) Field of Classification Search
CPC ............... F16J 15/3404; F16J 15/342
USPC ........... 141/95, 198, 302; 137/391; 277/408, 277/514; 222/61, 62, 67; 417/366, 368
See application file for complete search history.

(56) References Cited

U.S. PATENT DOCUMENTS

| 3,933,172 | A | * | 1/1976 | Allen | F16K 7/07 137/492 |
| 5,217,234 | A | * | 6/1993 | Hornsby | F16J 15/3404 277/366 |
| 5,249,812 | A | * | 10/1993 | Volden | F16J 15/162 277/361 |
| 5,636,847 | A | * | 6/1997 | Ostrowski | F04D 29/128 277/317 |
| 5,769,427 | A | * | 6/1998 | Ostrowski | F04D 29/128 277/318 |
| 6,070,880 | A | * | 6/2000 | McKeever | F16J 15/3404 277/304 |
| 6,210,107 | B1 | * | 4/2001 | Volden | F16J 15/162 277/408 |
| 7,082,962 | B2 | * | 8/2006 | Tahir | F16J 15/3404 137/391 |
| 7,258,143 | B2 | * | 8/2007 | Phipps | F04C 19/004 141/198 |
| 7,497,229 | B2 | * | 3/2009 | Tahir | F04D 29/108 137/391 |
| 9,470,315 | B2 | * | 10/2016 | Rea | F16J 15/3404 |

(Continued)

*Primary Examiner* — Nicolas A Arnett
(74) *Attorney, Agent, or Firm* — Edwin D. Schindler

(57) ABSTRACT

A seal support system for a mechanical seal includes a system vessel for containing barrier fluid. Closed loop pipe work connects the vessel to a mechanical seal with a device provided for feeding barrier fluid to the system vessel. A further vessel is provided that is able to be in fluid communication with the system vessel. The further vessel may be provided with an elastomeric membrane, which may be filled with a gas under pressure to an extent required to allow for the effect of the highest anticipated temperature which might occur in a particular application.

4 Claims, 1 Drawing Sheet

(56) References Cited

U.S. PATENT DOCUMENTS

| | | | |
|---|---|---|---|
| 2003/0122323 A1* | 7/2003 | Tahir | F16J 15/3404 277/630 |
| 2005/0081952 A1* | 4/2005 | Edward Phipps | F04C 19/004 141/198 |
| 2005/0184464 A1* | 8/2005 | Tahir | F16J 15/002 277/348 |
| 2006/0213574 A1* | 9/2006 | McKeever | F04D 29/108 141/95 |
| 2012/0235358 A1* | 9/2012 | Rea | F16J 15/3404 277/431 |
| 2014/0251590 A1* | 9/2014 | Iveson | F16J 15/162 165/287 |
| 2016/0131261 A1* | 5/2016 | Stephenson | F16J 15/3404 277/306 |

* cited by examiner

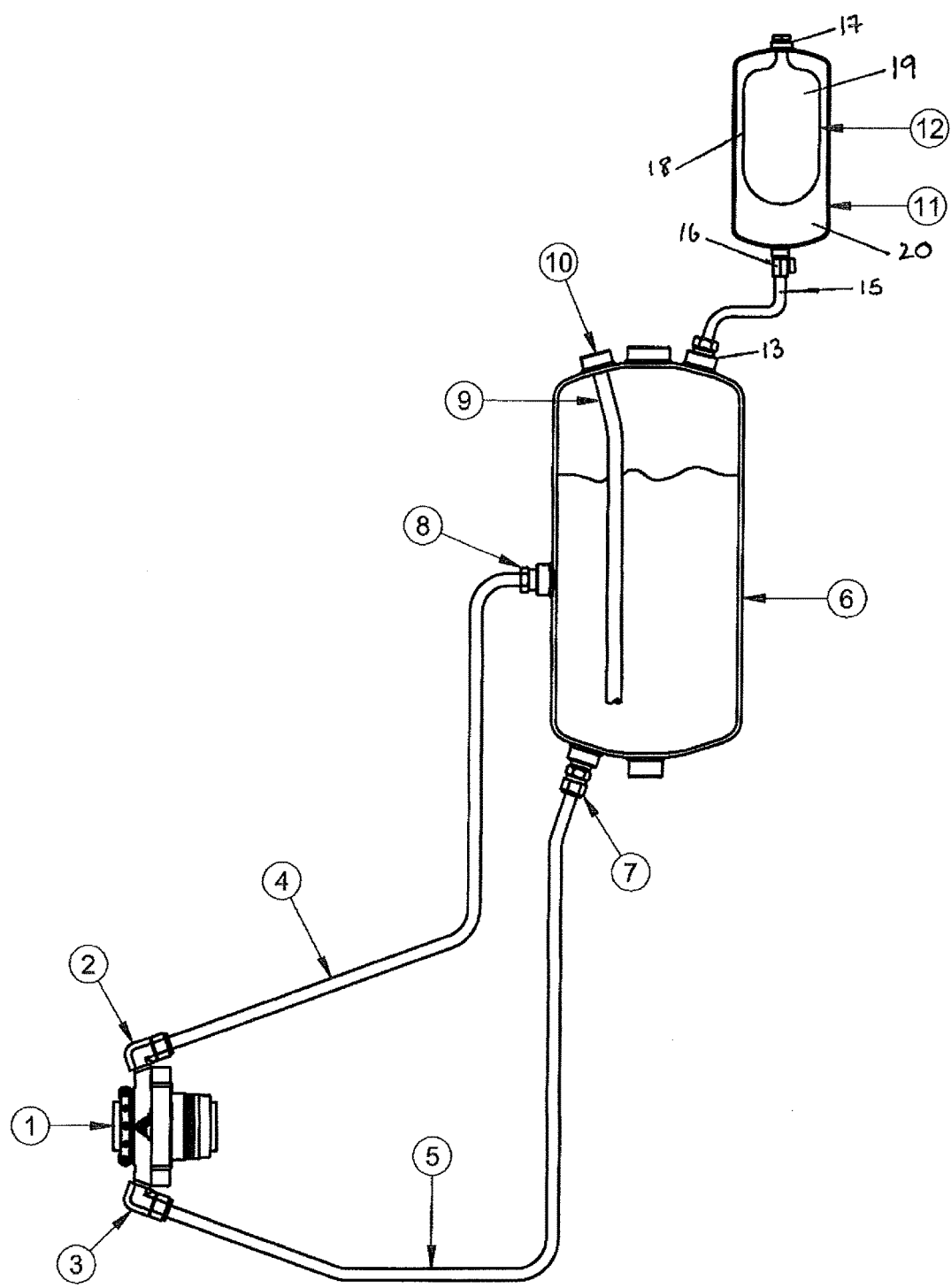

SUPPORT SYSTEMS FOR MECHANICAL SEALS

BACKGROUND OF THE INVENTION

Technical Field of the Invention

The present invention relates to seal support systems for double mechanical seals and, in particular, for double mechanical seals.

Description of the Prior Art

A mechanical seal comprises a stationary seal face and a rotary seal face energized against each other and connected to the stationary housing of a pump and the corresponding rotary shaft respectively. The seal faces are held in their respective positions most commonly by metallic components such as a gland or shaft sleeve.

A double mechanical seal has two sets of stationary and rotary seal faces, an inboard set and an out board set. There is a cavity between the two sets of seal faces and the outside diameter of the outboard faces is exposed to atmosphere. The purpose of this cavity is so that barrier fluid may be piped from a seal support system at a pressure higher than that of the product. This helps to optimize the running conditions of the seal and improve overall reliability.

Many seal support systems include a vessel which becomes pressurized when it is completely sealed and is filled with a barrier fluid. This is due to the available volume of gas within the vessel becoming compressed. This compression provides the required barrier fluid pressure which ensures the optimum running of the seal.

In some situations, the compressed gas within the vessel can be lost. This can be due to a number of factors including escape to the atmosphere through fixtures and fittings or through gas absorption, where the gas is absorbed into the barrier fluid.

When this occurs, the seal support vessel becomes completely filled with water and there is no further room for thermal expansion of the barrier fluid. This can result in, under certain situations, such as rising temperatures, the internal pressure of the system rising exponentially, leading to the pressure exceeding the maximum working limit of the vessel and potential damage to the vessel.

SUMMARY OF THE INVENTION

According to the present invention, there is provided a seal support system for a mechanical seal, the system comprising a system vessel for containing a barrier fluid, closed loop pipe work to connect said vessel to a mechanical seal, means for feeding barrier fluid to said system vessel and a further vessel which is fluid communicatable with said system vessel.

Accordingly, the further vessel provides a reservoir or accumulator function ensuring that there is sufficient overall space for expansion of the barrier fluid even at the highest anticipated temperature which might be reached.

Preferably, said further vessel contains an elastomeric membrane dividing said fluid vessel into first and second compartments, said further vessel having means whereby a gas may be fed to said first compartment and said second compartment being fluid communicatable with said system vessel.

Preferably, the further vessel is connected to an upper location of the system vessel. More preferably, a conduit interconnects an upper portion of the system vessel with said second compartment of said further vessel.

Preferably, said elastomeric membrane is in the form of a bladder attached to a closable inlet of the further vessel, through which inlet gas may be fed to bladder.

Preferably, the system provided for means for isolating the further vessel from the system vessel.

Accordingly the further vessel may be either used or not used, depending on the calculation of the pressure which could be reached in the system vessel having regard to maximum anticipated temperature of a particular application.

The present invention also provides a method for stabilizing gas pressure within a system vessel of a seal support system for a mechanical seal, the method comprising the steps of providing a further vessel and putting said further vessel in fluid communication with said system vessel.

Preferably, the further vessel has first and second compartments separated by an elastomeric membrane, the second compartment is put into fluid communication with said system vessel and gas is supplied to said first compartment until a pre-determined pressure is reached within said first compartment.

BRIEF DESCRIPTION OF THE DRAWING FIGURE

The accompanying single drawing FIGURE is a diagrammatic representation of a seal support system of the present invention shown fitted to a mechanical seal.

DETAILED DESCRIPTION OF THE DRAWING FIGURES

The present invention will now be described, by way of example only, with reference to the single accompanying drawing FIGURE.

A mechanical seal 1 includes inlet port 2 and outlet port 3, which are connected to respective supply pipe 4 and return pipe 5. These pipes 4, 5 are, in turn, connected to a system support vessel 6 by supply port 7 and return port 8.

System vessel 6 includes an inlet pipe 9, which is connected to a filled port 10. By this means barrier fluid may be supplied to support vessel 6. The inlet pipe 5 extends from the top of system vessel 6 to a position close to the bottom of the vessel and, in use, below the level of barrier fluid in the vessel.

System vessel 6 is provided with a further port 13 at the top of vessel 6. Connected to port 13 is a pipe or conduit which extends to a lower inlet port 16 of a further, or secondary, vessel 11.

Vessel 11 is provided with an upper port 17 connected to a bladder 12 located within further vessel 11. Gas may be supplied via port 17 to the interior of bladder 12.

Accordingly, bladder 12 separates the interior of further vessel 11 into two compartments, a first compartment 19, being located within bladder 18, and the second compartment 20 surrounding bladder 18.

In use, a calculation may first be performed in order to predict the pressure which might arise within vessel 6 at the maximum working temperature which could be reached in a particular application. The result of this calculation is then used to determine whether the further vessel 11 should placed in fluid communication with the system vessel 6. A further calculation can then be made to determine the extent to which the bladder 18 should be filled with gas under pressure.

While only several embodiments of the present invention have been shown and described, it will be obvious to those skilled in the art that many modifications may be made to the present invention without departing from the spirit and scope thereof.

What is claimed is:

1. A support system for a mechanical seal, comprising:
a system vessel for containing a barrier fluid;
closed loop pipe work for connecting said system vessel to a mechanical seal;
means for feeding barrier fluid to said system vessel; and,
a further vessel capable of fluid communication with said system vessel, said further vessel containing an elastomeric membrane dividing said further vessel into a first compartment and a second compartment, said further vessel including means for feeding a gas to said first compartment, said second compartment of said further vessel being fluid communicatable with said system vessel.

2. The support system according to claim 1, wherein the further vessel is fluid communicatable with an upper location of the system vessel.

3. The support system according to claim 1, wherein a conduit interconnects an upper position of said system vessel with said second compartment of said further vessel.

4. The support system according to claim 1, wherein said elastomeric membrane is a bladder attached to a closable inlet of said further vessel, through which inlet gas able to be fed to said bladder.

* * * * *